United States Patent
Huang (10) Patent No.: US 7,891,824 B2
(45) Date of Patent: Feb. 22, 2011

(54) REFLECTOR FOR A LIGHTING DEVICE AND ILLUMINATION SYSTEM OF A PROJECTION APPARATUS

(75) Inventor: Junejei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 642 days.

(21) Appl. No.: 11/937,758

(22) Filed: Nov. 9, 2007

(65) Prior Publication Data

US 2009/0016065 A1    Jan. 15, 2009

(30) Foreign Application Priority Data

Jul. 13, 2007    (TW) .............................. 96125590 A (51) Int. Cl.
*G03B 21/28*    (2006.01)

(52) U.S. Cl. .............................. 353/99; 353/94; 353/81; 353/98; 353/119; 353/122; 362/297; 362/298; 362/346; 362/347; 362/348; 362/296.01; 362/296.07; 362/296.1; 362/551; 362/558; 362/511; 359/629; 359/636; 359/838; 359/841; 359/849; 359/854; 359/856; 359/858; 359/859; 359/863; 359/727; 359/834; 359/851; 359/867; 359/869; 349/5; 349/7; 349/8; 349/67

(58) Field of Classification Search .............. 353/94, 353/81, 98, 99, 119, 122; 362/297, 298, 362/346, 347, 348, 296.01, 296.07, 296.1, 362/551, 558, 511; 359/297, 298, 346, 347, 359/348, 296.01, 296.07, 296.1, 551, 558, 359/511, 727, 834, 851, 867, 869; 349/5, 349/7, 8, 67

See application file for complete search history.

(56) References Cited

U.S. PATENT DOCUMENTS

| | | | | |
|---|---|---|---|---|
| 5,121,227 A * | 6/1992 | Fisher et al. | ................... | 359/1 |
| 5,798,805 A * | 8/1998 | Ooi et al. | ...................... | 349/10 |
| 6,773,143 B2 * | 8/2004 | Chang | ........................ | 362/346 |
| 7,131,736 B2 * | 11/2006 | Bierhuizen | ................... | 353/98 |
| 7,771,056 B2 * | 8/2010 | Kimura et al. | ................ | 353/98 |
| 2003/0123255 A1 * | 7/2003 | Marchetti | ................... | 362/296 |
| 2005/0083685 A1 * | 4/2005 | Yeh et al. | .................... | 362/227 |
| 2005/0270792 A1 * | 12/2005 | Suzuki | ....................... | 362/517 |
| 2006/0198139 A1 * | 9/2006 | Cheng | ........................ | 362/241 |
| 2006/0256564 A1 * | 11/2006 | Li | ............................. | 362/341 |
| 2007/0206165 A1 * | 9/2007 | Yatsu et al. | ................... | 353/98 |

* cited by examiner

*Primary Examiner*—Georgia Y. Epps
*Assistant Examiner*—Sultan Chowdhury
(74) *Attorney, Agent, or Firm*—Grossman, Tucker, Perreault & Pfleger, PLLC (57) ABSTRACT

A reflector for the lighting device and an illumination system of the projection apparatus are provided. The reflector comprises a first reflecting structure and a second reflecting structure disposed on the portion of the first reflecting structure. The reflecting surfaces of the first and second reflecting structures are formed with a distance therebetween. After the first portion of the light is reflected from the first reflecting surface and the second portion of the light is reflected from the second reflecting surface, the second portion of the light is adapted to remove the centrally dimmed area at the opening of the lighting device. Thus, the luminance performance can be improved.

23 Claims, 11 Drawing Sheets

REFLECTOR FOR A LIGHTING DEVICE AND ILLUMINATION SYSTEM OF A PROJECTION APPARATUS

This application claims the benefits of the priority based on Taiwan Patent Application No. 096125590 filed on Jul. 13, 2007; the disclosures of which are incorporated by reference herein in their entirety.

CROSS-REFERENCES TO RELATED APPLICATIONS

Not applicable.

BACKGROUND OF THE INVENTION

1. Field of the Invention

This invention relates to a reflector for a lighting device and an illumination system for use in a projection apparatus. In particular, the invention relates to a reflector that can effectively eliminate a centrally dimmed area generated from the opening of the lighting device in an illumination system of a projection apparatus.

2. Descriptions of the Related Art

The projection apparatus, which is widely used in offices, homes, conference rooms or the like, typically comprises a light source and other optical components such as prisms and imaging lens. Because uniform light rays are pertinent for the imaging quality of the projection apparatus, the light source is one of the critical components in the projection apparatus.

Figure 1A:
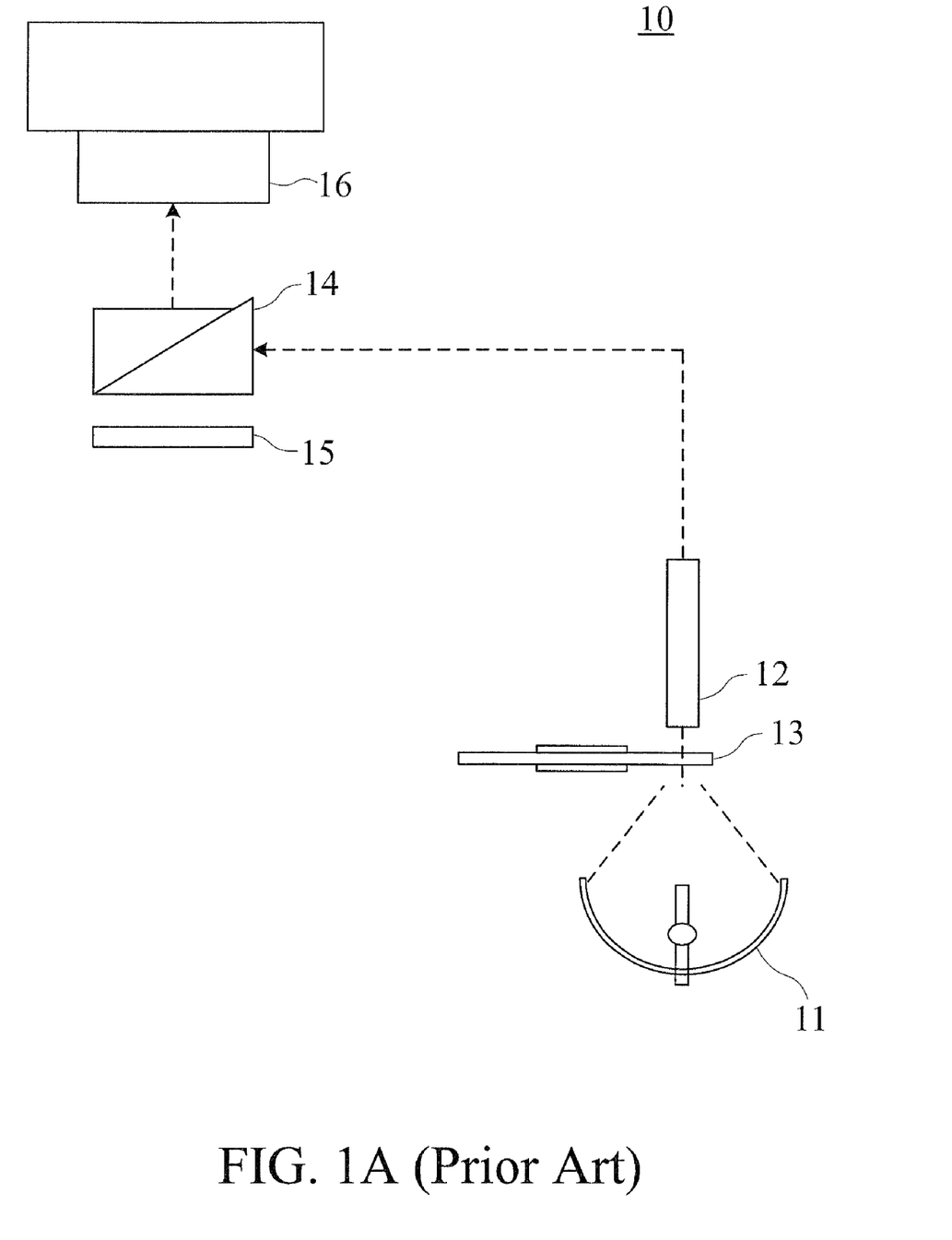
FIG. 1A is a schematic view illustrating the interior of a conventional projection apparatus.

Among various types of projection apparatuses, the digital light processing (DLP) projection apparatus, which can generate a sequence of digital light pulses in response to a digital signal, has been popular on the market. An internal arrangement of a conventional DLP projection apparatus is depicted in FIG. 1A. The projection apparatus 10 comprises a light source 11, a light integration rod 12, a color wheel 13, a light-coupling device 14, a digital micro-mirror device (DMD) 15, and a lens 16. Here, only a single DMD 15 and a single light source 11 are shown as an example. The ultra high-pressure (UHP) lamp, which costs less and has a high light emitting efficiency, is the preferred light source 11.

In the configuration depicted in FIG. 1A, the color wheel 13 is adapted to convert light emitted from the light source 11 into light of the three primary colors. Specifically, when the light passes through the light integration rod 12, it is preliminarily turned into images. Then, the color wheel 13, typically disposed at the entrance of the light integration rod 12, generates the three primary colors selectively. Subsequently, upon entering the light coupling device 14, the light is reflected and modulated by individual micro-mirror structures of the DMD 15 and is finally projected by the projection lens 16.

To improve the luminance of the illumination system, a multi-light-source arrangement may be considered so that light from multiple light sources are projected into the light integration rod 12 together for light integration before being used in other back-end optical elements. However, due to the restriction imposed by the étendue conservation law in the DMD 15, a simply addition of light sources will not result in an equivalent improvement of the luminance as desired. Consequently, the configuration of the light sources to achieve an optimal effect has become one of the greatest challenges posed to the designers of illumination systems.

Figure 1B:
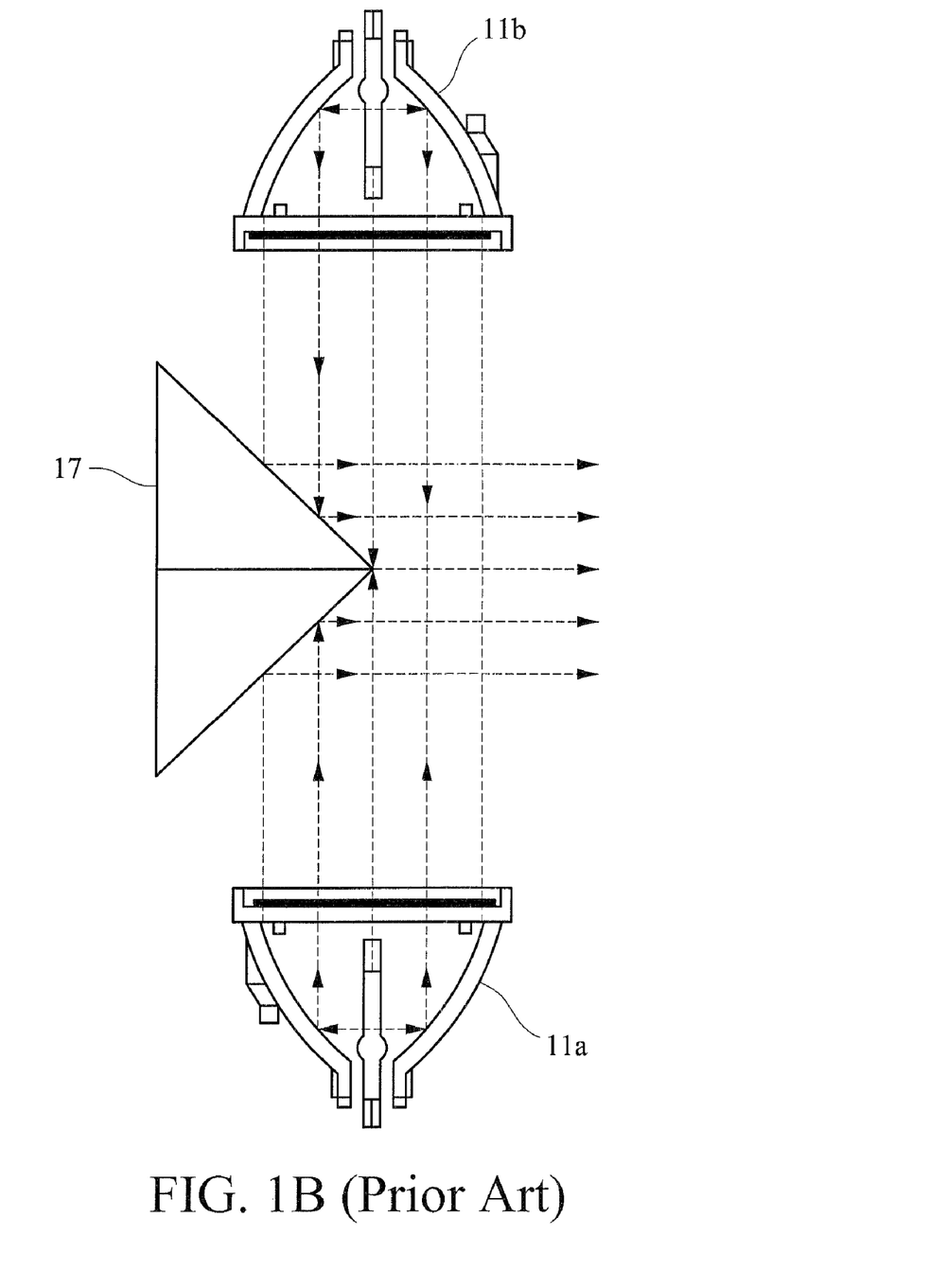
FIG. 1B is a schematic view illustrating a conventional retro-reflect system.

In consideration of the restriction imposed by the étendue conservation law, a conventional way for improvement is to design the optical path as a retro-reflect system. As an example, two parabolic lighting devices 11a, 11b that can emit parallel light are illustrated in FIG. 1B. With the two parabolic lighting devices 11a, 11b disposed opposite of each other, a portion of the parallel light projected from the parabolic lighting devices 11a, 11b is outwardly reflected by a reflecting prism 17 directly, while the remaining portion is first reflected inside the opposite lighting device and then guided to reflect from the reflecting prism 17. As a result, a portion of the light may be reclaimed before being reflected, thus meeting the restriction imposed by the étendue conservation law on the system.

Figure 1C:
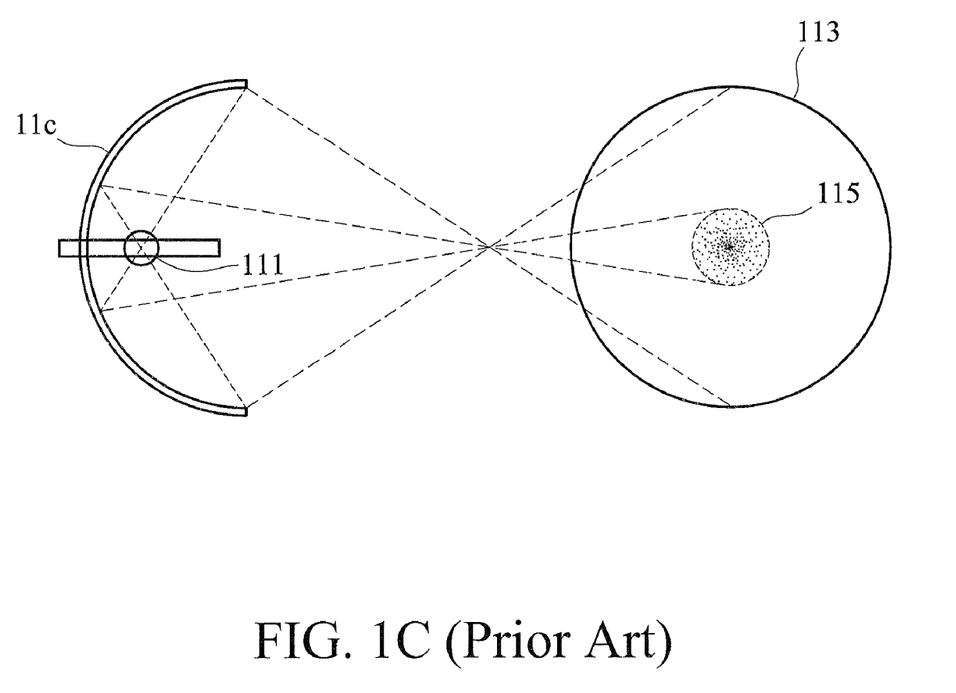
FIG. 1C is a schematic view illustrating a conventional lighting device with the centrally dimmed area.

However, some drawbacks still exist with the retro-reflect system. For example, if a lighting device with a bulb (e.g. an UHP lamp) is employed, limitations of the structure may lead to a centrally dimmed area in the light projected from the opening of the lighting device. For example, if an elliptical lighting device 11c is used, as shown in FIG. 1C, a dim area will occur in the center 115 of the projection plane 113 formed by the light projected from the opening since the lighting device 11c comprises a bulb 111. The dimmed area decreases the overall luminance.

In view of this, it is highly desirable to provide a reflector that can effectively eliminate the occurrence of a centrally dimmed area in an illumination system of a projection apparatus.

SUMMARY OF THE INVENTION

One objective of this invention is to provide an illumination system for use in a projection apparatus and a reflector for a lighting device. In the present invention, an additional reflecting surface with a different thickness is locally disposed on the original reflecting surface of the reflector, leading to a local shift of the light after reflection. The centrally dimmed area is thus removed. In consideration of the étendue conservation law, light at the fringe portion of a lighting device will not be used for projection in practice, so even a locally dimmed portion generated at the edge of the projection surface after shift will not influence the overall luminance.

Another objective of this invention is to provide an illumination system for use in a projection apparatus and a reflector for a lighting device. In the structure disclosed in this invention, the optical couplings are accomplished mostly in traditional optical manners to avoid light loss during the light coupling process.

Yet a further objective of this invention is to provide a reflector for a lighting device and an illumination system for use in a projection apparatus. The reflector may be associated with other illumination systems such as a retro-reflect system. The reflector may also partially shift the reflected light to compensate and eliminate the centrally dimmed area generated at the lighting device opening.

To achieve the abovementioned objectives, a reflector for a lighting device is provided in this invention. The lighting device comprises a luminous portion and a reflecting portion, wherein the luminous portion is adapted to emit light and the reflecting portion is adapted to project the light towards the reflector. The reflector comprises a first reflecting structure and a second reflecting structure. The first reflecting structure has a first reflecting surface. The first portion of the light reflected by the first reflecting surface forms the first bright area and dim area on the projection surface. The second reflecting structure is locally disposed on the first reflecting surface, and has a second reflecting surface formed a certain distance from the first reflecting surface. The second portion of the light reflected by the second reflecting surface forms a second bright area on the projection surface to at least partially cover the dim area, thus, eliminating the conventional centrally dimmed area on the projection surface. Additionally, this invention further provides an illumination system for use in a projection apparatus, which comprises the lighting device and the reflector described above.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
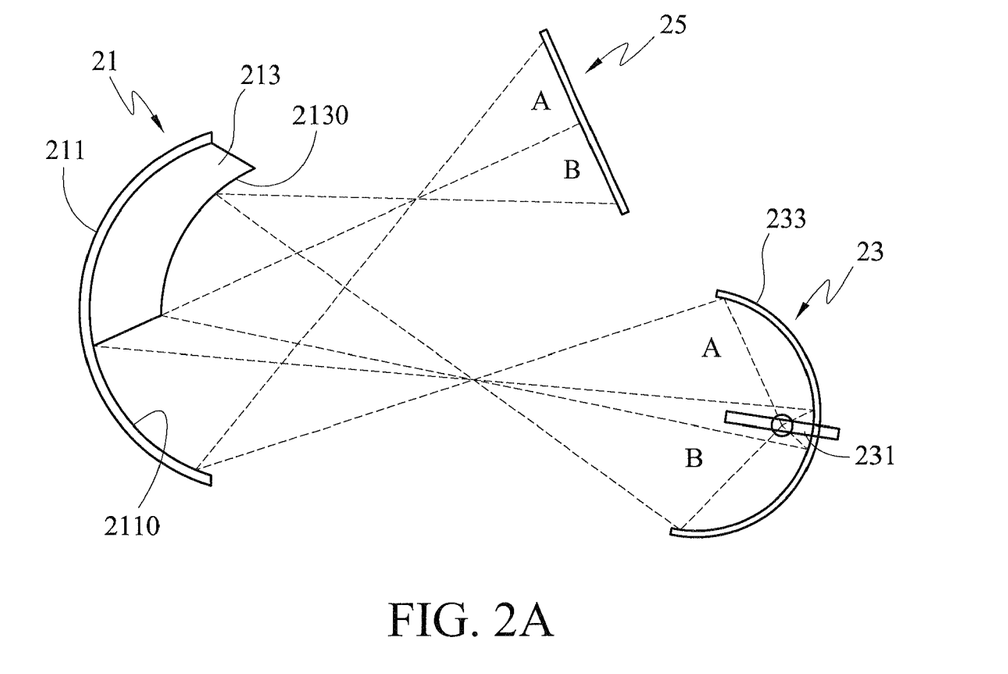
FIGS. 2A-2D are schematic views illustrating the first embodiment of the present invention.
Figure 2B:
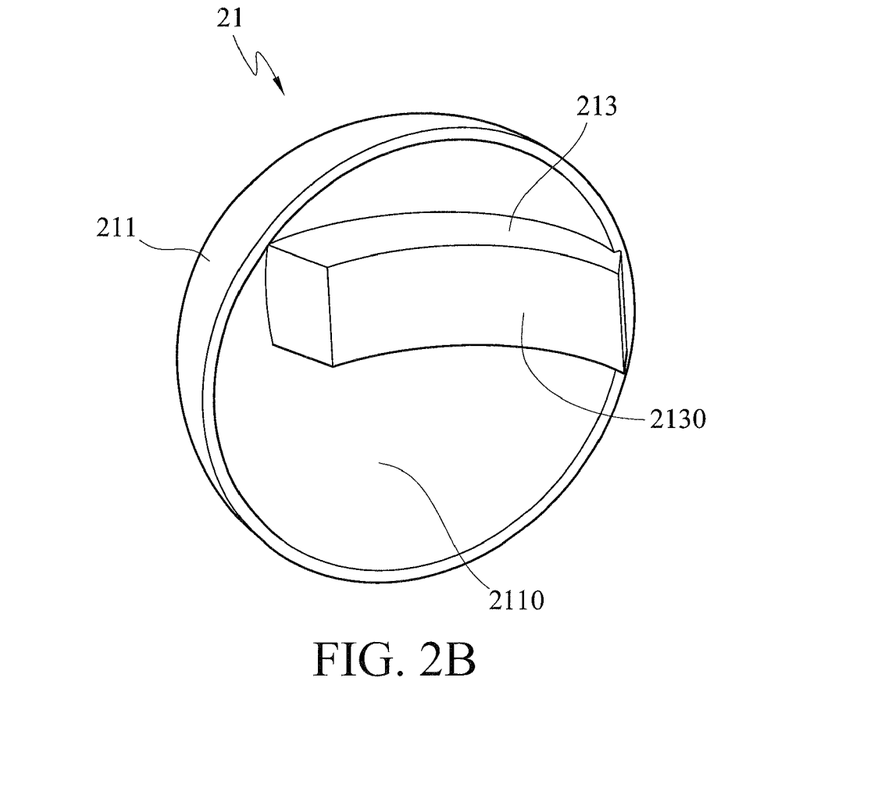

The first embodiment of the reflector of this invention is depicted in FIGS. 2A and 2B. The reflector 21 is associated with a lighting device 23, which comprises a luminous portion 231 and a reflecting portion 233. Light emitting from the luminous portion 231 is reflected by the reflecting portion 233 and projected towards the reflector 21. In this embodiment, the reflecting portion 233 is elliptical in shape to converge the light emitted from the luminous portion 231.

More specifically, the reflector 21 comprises a first reflecting structure 211 and a second reflecting structure 213. The first reflecting structure 211 has a first reflecting surface 2110, while the second reflecting structure 213 has a second reflecting surface 2130, both of which may be concave surfaces. The first reflecting surface 2110 and the second reflecting surface 2130 should preferably have an adequate curvature so that both surfaces have the same focus point. The first reflecting surface 2110 and the second reflecting surface 2130 may either be parallel or unparallel to each other. Variations may be readily made on the reflecting surfaces by those skilled in the art.

The second reflecting structure 213 is locally disposed on the first reflecting surface 2110 at a certain distance from the second reflecting surface 2130 and the first reflecting surface 2110. A perspective view of the second reflecting structure 213 is depicted in FIG. 2B. In this embodiment, the second reflecting structure 213 is disposed so that it protrudes from the first reflecting surface 2110 and strip-like in shape. However, the shape of the second reflecting structure 213 may be varied depending on specific design requirements, and is not just limited thereto.

Conceivably, light emitting from the luminous portion 231, after being projected by the reflecting portion 233 and reflected by the reflector 21, is adapted to form a bright area on a projection surface 25. For convenience of description, the light emitting from the luminous portion 231 may be divided into a first portion A and a second portion B. The first portion A is reflected by the first reflecting surface 2110 to project towards the projection surface 25, while the second portion B is reflected by the second reflecting surface 2130 to project towards the projection surface 25. In this embodiment, since the second portion B is reflected by the second reflecting surface 2130 instead, it appears to have a shift on the projection surface 25 as compared to the conventional projection approach, thus compensating for the centrally dimmed area.

Figure 2C:
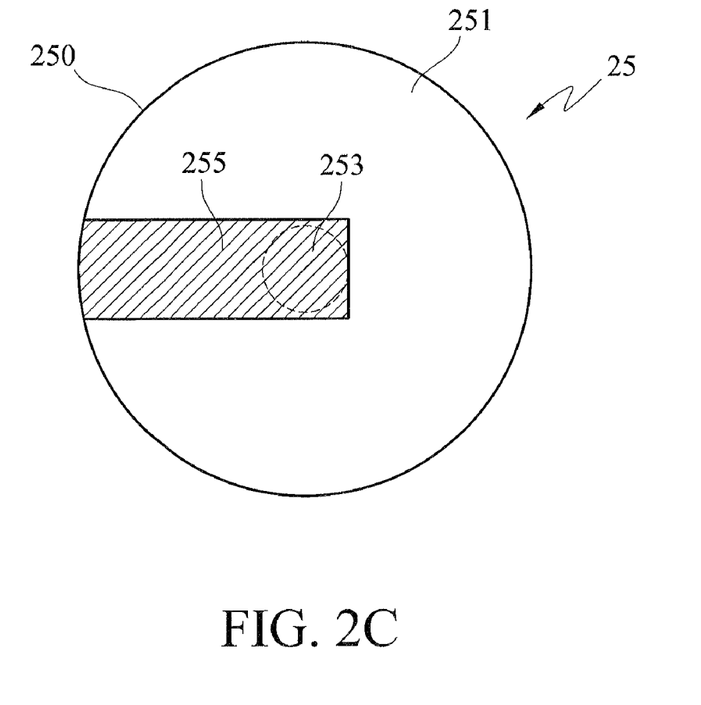
Figure 2D:
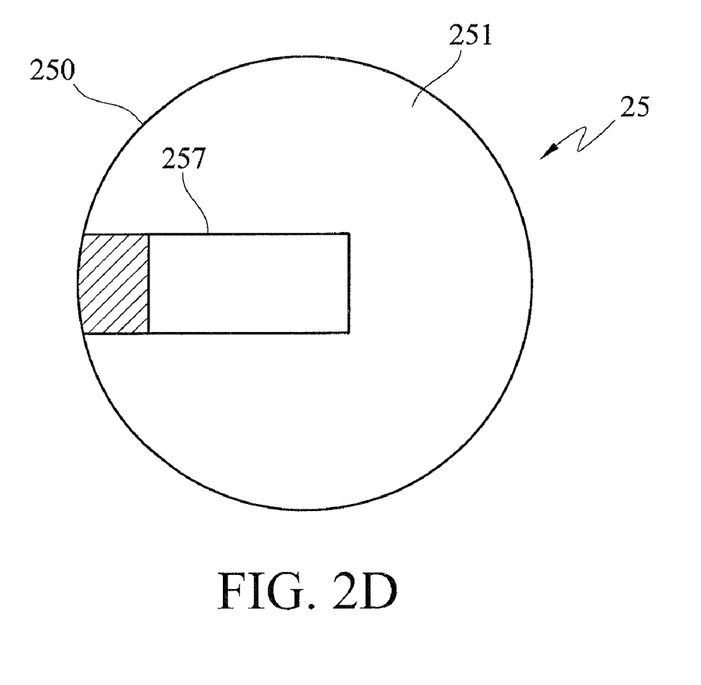

More specifically, FIG. 2C is a schematic view illustrating the projection of only the first portion A onto the projection surface 25. The first portion A projected onto the projection surface 25 forms the first bright area 251 and dim area (as shown by a hatched portion in FIG. 2C). The dim area may be further divided into a first dim portion 253 and a second dim portion 255. The first dim portion 253 is substantially located at the center of the first bright area 251, and at least covers the central dim area that tends to occur in the prior art (as shown by a dashed circle in FIG. 2C). The second dim portion 255 is substantially defined between the first dim portion 253 and the border 250 of the bright area 251. As shown in FIG. 2D, it is clear that the second portion B of the light is exactly reflected by the second reflecting surface 2130 of the second reflecting structure 213, and forms a second bright area 257 on the projection surface 25 which covers at least a portion of the dim area described above, particularly the first dim portion 253. In this way, the second portion B of the light reflected by the second reflecting structure 213 shifts on the second bright area 257 on the projection surface, thus compensating for the conventional centrally dimmed area. More specifically, the second bright area 257 that was conventionally projected onto the second dim portion 255 is now shifted to at least cover the first dim portion 253.

In other words, the concept of the present invention is to eliminate the dim light of the centrally dimmed area by projecting adequate light that would be conventionally projected elsewhere onto the central area. Referring again to FIG. 2A, a portion of the light that would project onto the central dim area in the prior art will not be utilized in this embodiment, i.e. will not be reflected onto the projection surface 25. The resulting dim area will be compensated by adequate light shifted from other portions. It should be noted that, although this may lead to a local dimmed area at the fringe (as shown by the hatched portion in FIG. 2D), the fringe area is not used for projection due to the restriction imposed by the étendue conservation law, and therefore will not impact the overall performance.

Figure 3A:
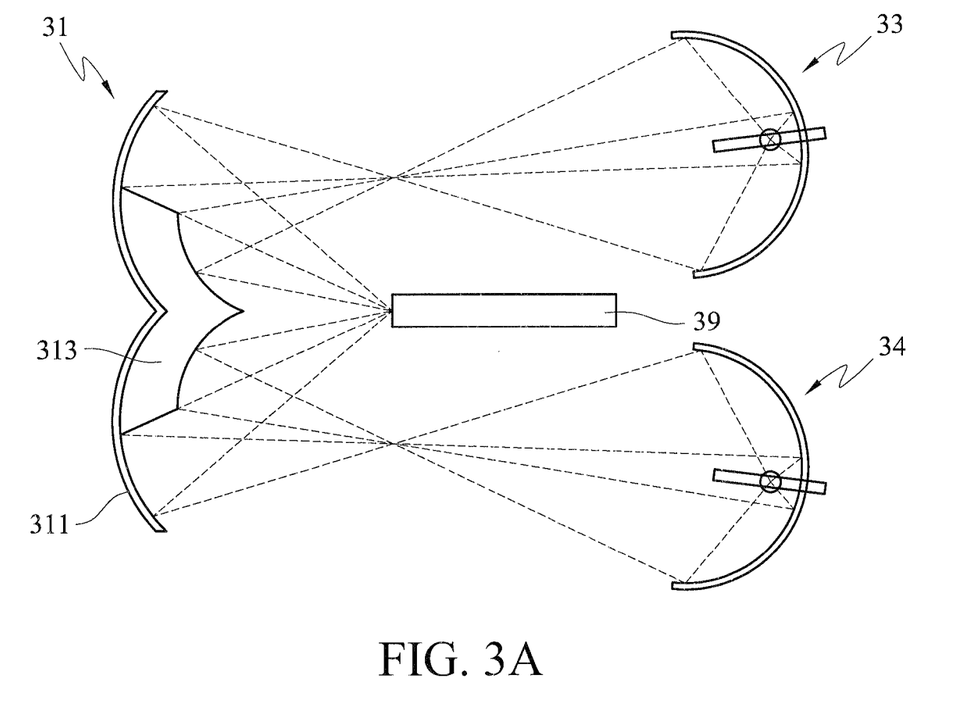
FIGS. 3A-3B are schematic views illustrating the second embodiment of the present invention.
Figure 3B:
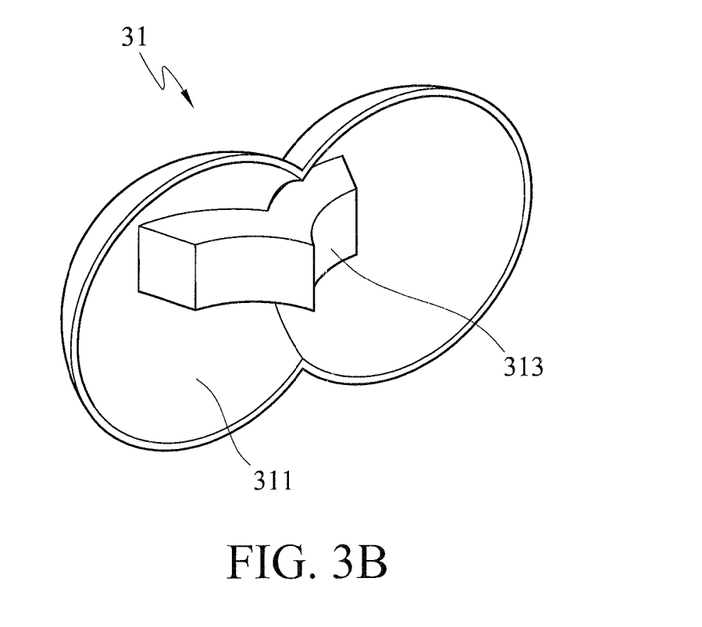

The second embodiment of this invention is depicted in FIG. 3A, in which the inventive concept of the first embodiment is used with two lighting devices. As illustrated in FIG. 3B, the reflector 31 comprises two concave reflecting surfaces of a particular curvature, which correspond to lighting devices 33, 34 respectively. Specifically, the reflector 31 comprises a first reflecting structure 311 and a second reflecting structure 313. The first reflecting structure 311 has two reflecting surfaces adjacently disposed facing the same direction. The second reflecting structure 311 is locally formed outwards on the first reflecting structure 311, and also has two concave reflecting surfaces adjacently disposed facing the same direction. The reflecting surfaces of the first reflecting structure 311 and second reflecting structures 313 should have the same focus point as that of the first reflecting structure 311. The reflecting surfaces of the first reflecting structure 311 and of the second reflecting structure 313 are separated a certain distance from each other, and may be either parallel or unparallel to each other. The details of which will not be further described in detail herein. As depicted in this figure, the second reflecting structure 313 may be shaped like a strip and arranged in the center of the first reflecting structure 311. This strip-like shape of the second reflecting structure 313 is only intended to illustrate rather than to limit the shape thereof.

After being reflected by the first reflecting structure 311 and the second reflecting structure 313, the respective portions of light generated from the lighting devices 33, 34 will shift on the projection surface to compensate for the centrally dimmed area. Thereafter, the conditioned light will be gathered into a light integration rod 39, where the light is uniformed for use in subsequent optical components.

Figure 4:
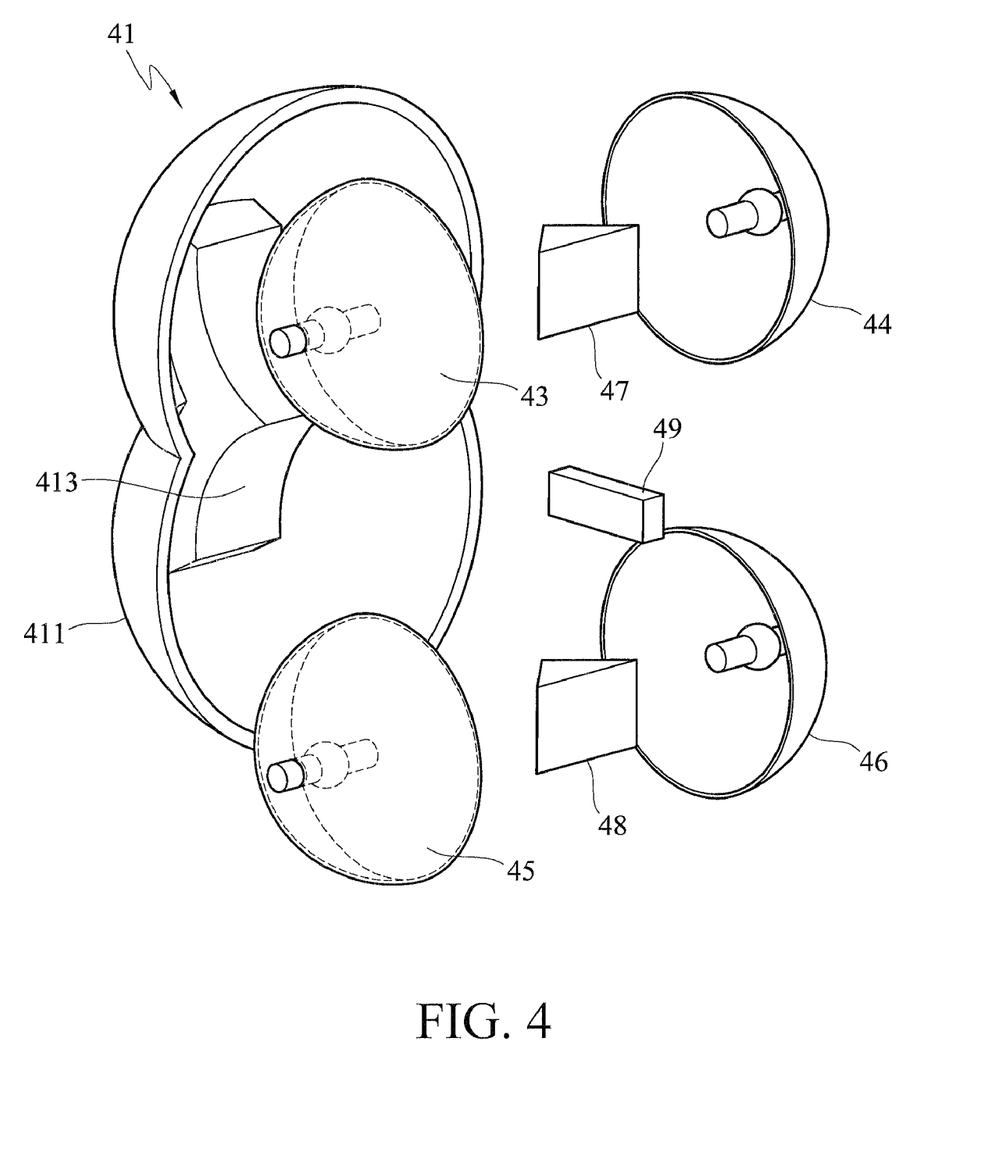
FIG. 4 is a schematic view illustrating the third embodiment of the present invention.

The third embodiment of this invention is associated with four lighting devices, as depicted in FIG. 4. A reflector 41, which is similar to that of the second embodiment in structure, comprises two concave reflecting structures of a particular curvature, i.e. a first reflecting structure 411 and a second reflecting structure 413. The second reflecting structure 413 is locally disposed on the first reflecting structure 411 and has the same focus point as the first reflecting structure 411. The reflecting structures are spaced a certain distance from each other and may either be parallel or unparallel to each other.

Light generated from the lighting devices 43, 44 are guided by a reflecting prism 47 to project onto the reflector 41. Similarly, light generated from the lighting devices 45, 46 are guided by the reflecting prism 48 to project onto the reflector 41. After being reflected by the first reflecting structure 411 and the second reflecting structure 413, light in the centrally dimmed area is eliminated, and by means of the second reflecting structure 413, a second portion of light is shifted to project onto the dim area formed by the first portion to at least compensate for the centrally dimmed area. Thereafter, the conditioned light will be gathered into a light integration rod 49, where the light is uniformed for use in subsequent optical components.

Figure 5A:
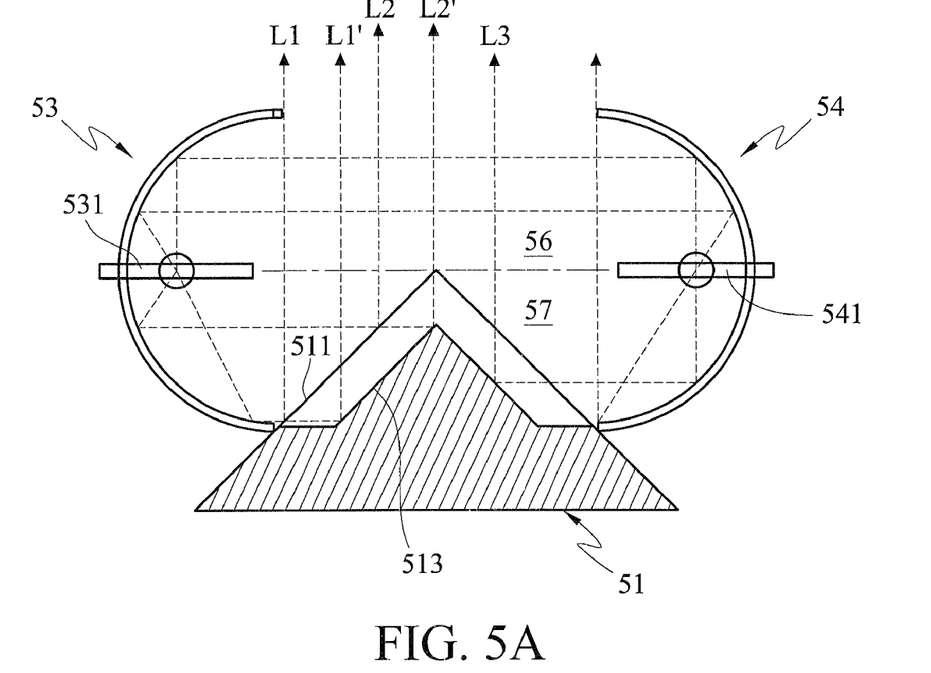
FIGS. 5A-5D are schematic views illustrating the fourth embodiment of the present invention.
Figure 5B:
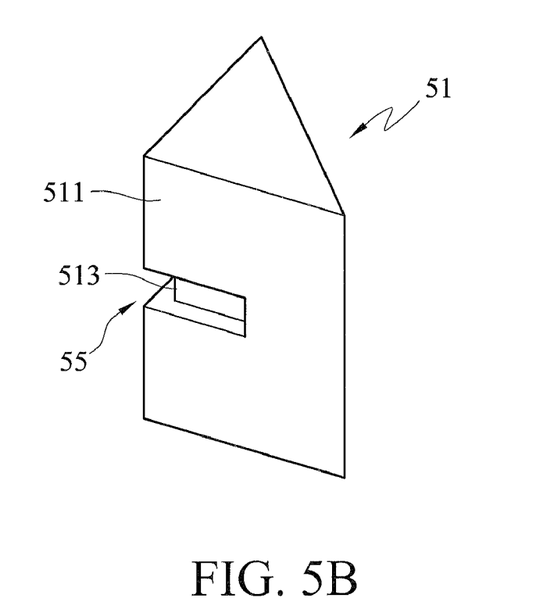

The reflector disclosed in this invention may also be applied to a parabolic lighting device that emits parallel light to constitute a retro-reflect system. The fourth embodiment of this invention is depicted in FIG. 5A, where a reflector 51 is associated with two parabolic lighting devices 53, 54 emitting parallel light. The reflector 51 comprises a first reflecting structure 511 and a second reflecting structure 513, which have a first reflecting surface and a second reflecting surface respectively for projecting the light generated from the lighting devices 53, 54 to a bright area on the projection surface. FIG. 5B illustrates the perspective view of the reflector 51. In this embodiment, both the first and second reflecting surfaces are flat surfaces. More specifically, the first reflecting structure 511 may be a triangular prism with two inclined planes, which have an angle, included therebetween and define the first reflecting surface. The second reflecting structure 513 has two recesses 55 locally disposed on the first reflecting surface of the first reflecting structure 511. The bottom surfaces of the recesses 55 are recessed a certain distance from the first reflecting surface to define the second reflecting surface.

As shown in FIG. 5A, the two lighting devices 53, 54 disposed opposite from each other can define a space therebetween, through which light emitted from both lighting devices 53, 54 propagates before being projected outside by the reflector 51. That is, the straight line connecting the two luminous portions 531, 541 of the lighting devices 53, 54 may be used to divide the space into a first half portion 56 and a second half portion 57, in which the first half portion 56 is proximate to the projection surface (not shown), while the second half portion 57 is distal from the projection surface. In this embodiment, the reflector 51 is located inside the second half portion 57.

Figure 5C:
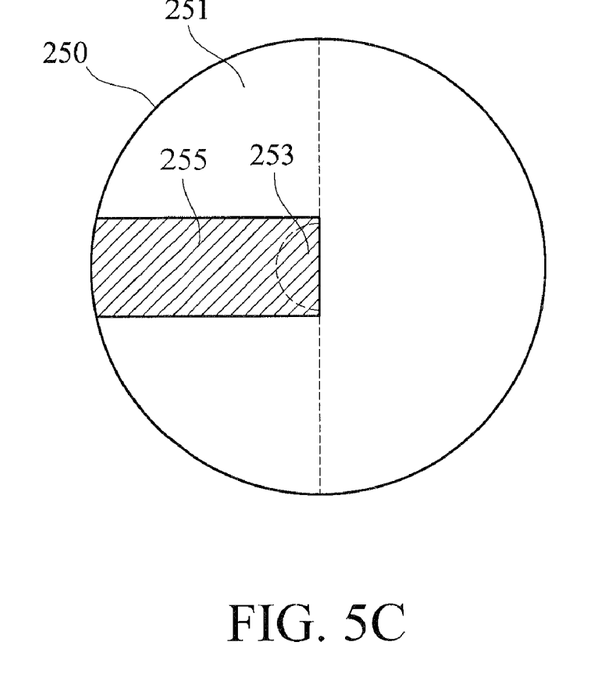
Figure 5D:
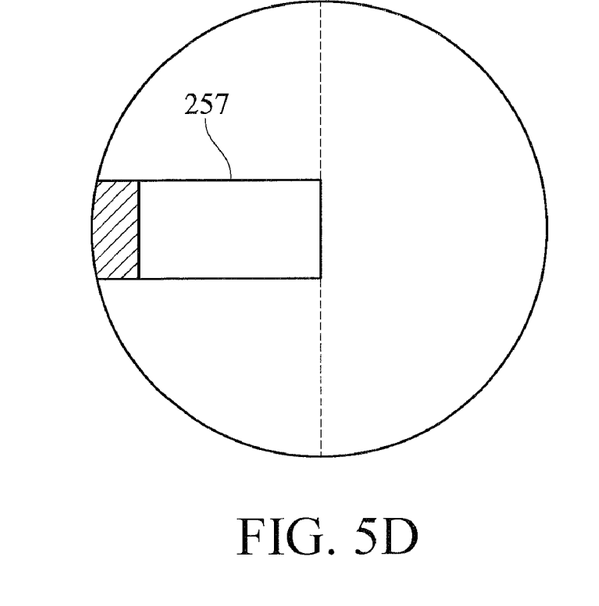

FIGS. 5C and 5D show only the left half of the projection surface, while the right half thereof is symmetric and will not be described in detail herein. The first portion of light reflected by the first reflecting surface of the first reflecting structure 511 propagates along the original path to project a first bright area 251 and a dim area (as shown by the hatched portion in FIG. 5C). The dim area may be divided into a first dim portion 253 and a second dim portion 255, wherein the first dim portion 253 may be defined at the center of the first bright area 251, and at least covers the conventional centrally dimmed area. The second dim portion 255 is substantially located between the first dim portion 253 and a border of the bright area 251. With the structure of this embodiment, light in the conventional centrally dimmed area is eliminated and is compensated for the second portion of light after shift.

On the other hand, the second portion of light reflected by the second reflecting surface of the second reflecting structure 513 will travel on an altered path. Due to the second reflecting structure 513 of this embodiment, light traveling along the light path L1, L2 as shown in FIG. 5A will be reflected with a delay, following the light path L1', L2' instead. Therefore, when the second portion of light is projected onto the projection surface, the second bright area 257 shown in FIG. 5D will partially cover the dim area, and preferably cover the first dim portion 253 and a part of the second dim portion 255. Likewise, a symmetric result will occur in the right half of the projection surface to completely cover the area of the conventional dimmed area.

Similarly, although this approach may lead to a local dim area at the fringe (as shown by the hatched portion in FIG. 5D), in consideration of the restriction imposed by the étendue conservation law on the projection system, such the fringe area will not be used for projection and therefore will not impact the overall performance.

Due to the "retro-reflection" phenomenon, it should be further noted that the light propagating in the first half portion 56 of the space will first be projected into the opposite lighting device where it is subjected to an internal reflection, then projected towards the second half portion 57, and finally projected onto the projection surface, as shown by the light path L3 in FIG. 5A. The output light may further propagate through a light gathering device, a light integration rod (not shown) or the like to be gathered and uniformed therein for use in other subsequent optical components.

Figure 6A:
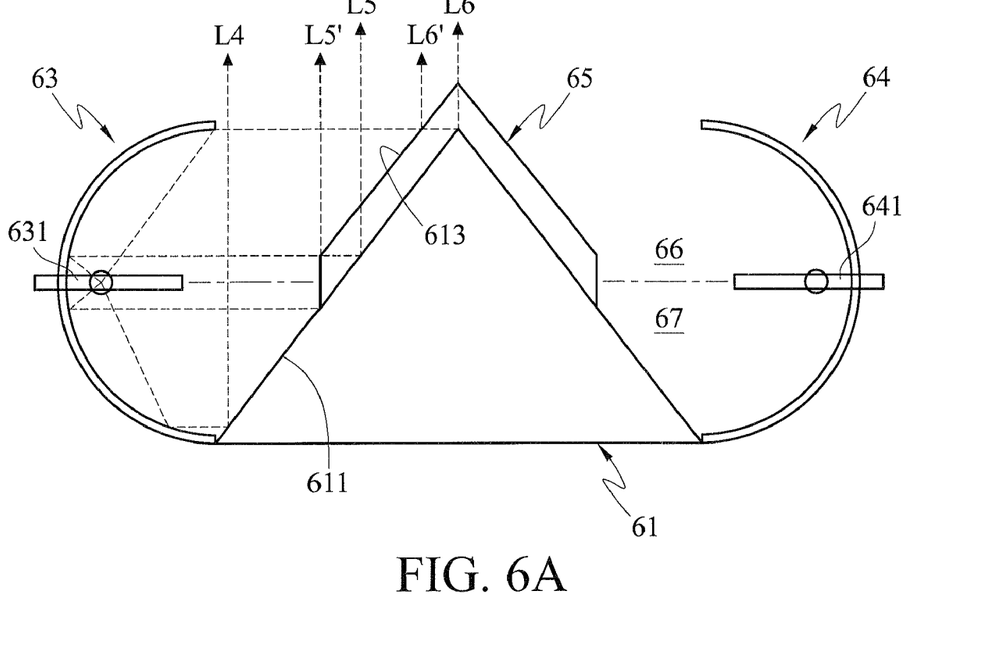
FIGS. 6A-6D are schematic views illustrating the fifth embodiment of the present invention.
Figure 6B:
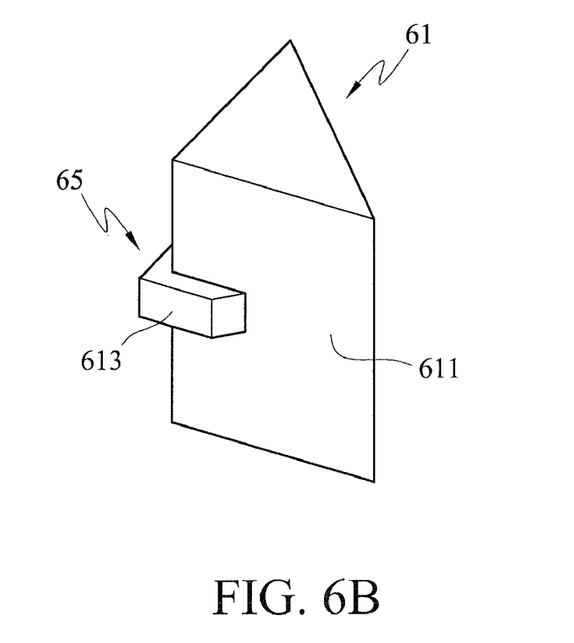

The fifth embodiment of this invention does not utilize a retro-reflect system, as depicted in FIGS. 6A and 6B. In this embodiment, a reflector 61 and two oppositely disposed lighting devices 63, 64 are included. The lighting devices 63, 64 have luminous portions 631, 641 respectively. Likewise, for convenience of description, a straight line connecting the two luminous portions 631, 641 may be defined to divide the space between the lighting devices 63, 64 into a first half portion 66 proximate to the projection surface (not shown) and a second half portion 67 distal from the projection surface.

The reflector 61 comprises a first reflecting structure 611 and a second reflecting structure 613 for projecting the light emitted from the lighting devices 63, 64 onto the projection surface to form a bright area. The first reflecting structure 611 may be a triangular prism consisting of two inclined planes with an angle between them to define the first reflecting surface. The second reflecting structure 613 comprises two protrusions 65 disposed on the first reflecting surface of the first reflecting structure 611 respectively. In this embodiment, the protrusions 65 are formed inside the first half portion 66, and the top surface of the protrusions 65 defines the second reflecting surface.

Figure 6C:
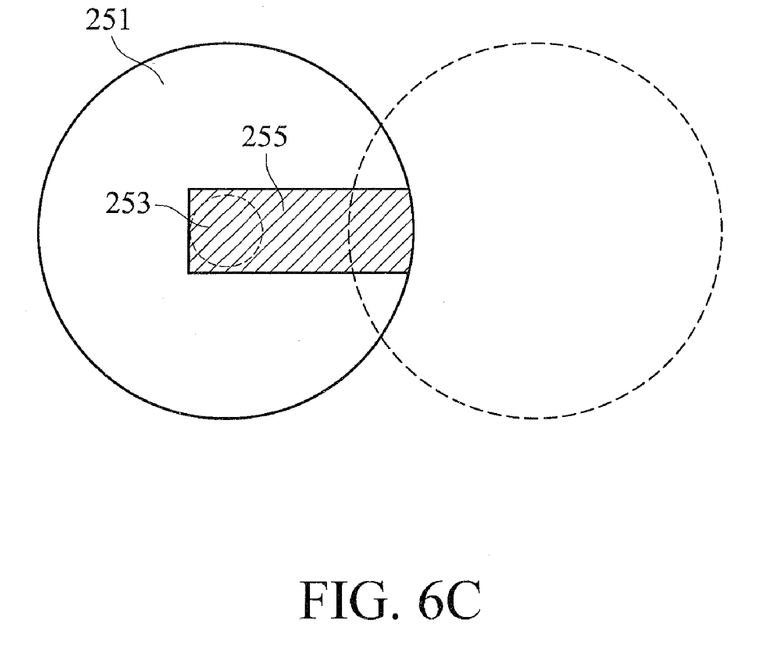

With the protrusions 65 of the second reflecting structure 613, the first portion of light reflected by the first reflecting surface of the first reflecting structure 611 still travels along the original path, as shown by the light path L4 in FIG. 6A. As shown in FIG. 6C, the first portion of light will form a first bright area 251, a first dim portion 253 and a second dim portion 255 on the projection surface. On the other hand, the second portion of light reflected by the second reflecting surface of the second reflecting structure 613 would travel along another path, as shown in FIG. 6A. Specifically, the light as shown along the light paths L5, L6 will be reflected in advance and travel along the light paths L5', L6' instead. Therefore, when the light is finally projected onto the projection surface, a local shift of the bright area will occur.

Figure 6D:
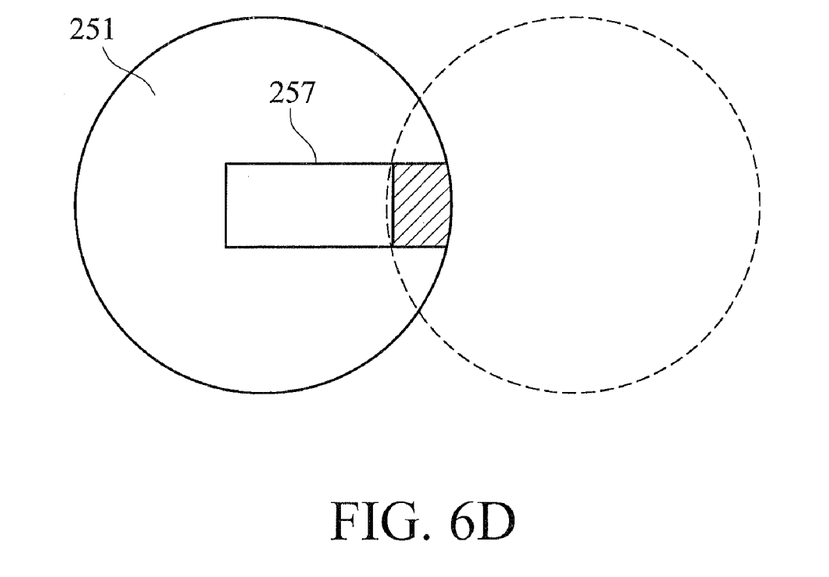

In other words, the second bright area 257 generated by the second portion of light passing through the second reflecting structure 613 will compensate for the local dim area (i.e. the first dim portion 253 and a portion of the second dim portion 255) caused by the first portion of light. Likewise, a similar result will occur in the right half of the projection surface, thereby completely compensating for the conventional centrally dimmed area. Further, because some diffusions tend to occur after light is projected; an intersection area will be observed between the projection surfaces depicted in FIG. 6C and FIG. 6D. Conceivably, such diffusion may also serve to compensate for the dim areas on the fringe.

The output light may further be gathered and uniformed by a light gathering device, a light integration rod (not shown) or the like for subsequent use in other optical components.

In accordance with the disclosure of this invention, to compensate for the centrally dimmed area, a shift of light is intentionally introduced. Consequently, a local fringe dim area may be formed between the shifting area and a fringe of the projection surface. However, in consideration of the restriction imposed by the étendue conservation law, such a fringe area will not be used for other optical components in practice and therefore will not impact the overall performance.

It follows from the above description that, this invention introduces a local shift of the reflected light by making a local variation to the reflector, thereby to compensate for the centrally dimmed area with a portion of the bright area, thus, achieving a better imaging quality.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A reflector system comprising:
   a first reflecting structure having a first reflecting surface configured to reflect a first portion of light emitted from a lighting device to form a first bright area and a dim area on a projection surface; and
   a second reflecting structure locally disposed on the first reflecting surface, the second reflecting structure having a second reflecting surface being formed a distance with the first reflecting surface, the light including a second portion being reflected by the second reflecting surface to form a second bright area on the projection surface to at least partially cover the dim area.

2. The reflector system as claimed in claim 1, wherein the dim area includes a first dim portion and a second dim portion, the first dim portion is substantially located at a central area of the first bright area and the second dim portion is substantially located between the first dim portion and a border of the first bright area.

3. The reflector system as claimed in claim 2, wherein the second bright area substantially completely covers the first dim portion of the dim area.

4. The reflector system as claimed in claim 1, wherein each of the first reflecting surface and the second reflecting surface is a flat surface.

5. The reflector system as claimed in claim 4, wherein the first reflecting structure has an inclined plane which defines the first reflecting surface, and the second reflecting structure has a recess being formed on the first reflecting structure with the recess having a bottom surface which defines the second reflecting surface.

6. The reflector system as claimed in claim 4, wherein the first reflecting structure has an inclined plane which defines the first reflecting surface, and the second reflecting structure has a protrusion being formed on the first reflecting structure with the protrusion having a top surface which defines the second reflecting surface.

7. The reflector system as claimed in claim 1, wherein the first reflecting surface includes a first inward curved surface and the second reflecting surface includes a second inward curved surface being formed a distance with the first inward curved surface.

8. The reflector system as claimed in claim 7, wherein each of the first inward curved surface and the second inward curved surface substantially has an adequate curvature whereby both surfaces have the same focus point.

9. The reflector system as claimed in claim 7, wherein the first inward curved surface and the second inward curved surface are substantially parallel with each other.

10. The reflector system as claimed in claim 7, wherein the first inward curved surface and the second inward curved surface are substantially unparallel with each other.

11. An illumination system comprising:
    at least one lighting device including a luminous portion and a reflecting portion; and
    a reflector, in which the luminous portion is adapted to emit light and the reflecting portion is adapted to project the light towards the reflector, the reflector comprising:
       a first reflecting structure having a first reflecting surface, the light including a first portion being reflected by the first reflecting surface to form a first bright area and a dim area on a projection surface; and
       a second reflecting structure locally disposed on the first reflecting surface, the second reflecting structure having a second reflecting surface being formed a distance with the first reflecting surface, the light including a second portion being reflected by the second reflecting surface to form a second bright area on the projection surface to at least partially cover the dim area.

12. The illumination system as claimed in claim 11, wherein the dim area includes a first dim portion and a second dim portion, the first dim portion is substantially located at a central area of the first bright area and the second dim portion is substantially located between the first dim portion and a border of the first bright area.

13. The illumination system as claimed in claim 12, wherein the second bright area substantially completely covers the first dim portion of the dim area.

14. The illumination system as claimed in claim 11, wherein the first reflecting structure is a triangular prism having two inclined planes forming an angle therebetween, in which the two inclined planes define two first reflecting surfaces, and the second reflecting structure has two recesses, being respectively formed on the two inclined planes, with the recesses having bottom surfaces which define two second reflecting surfaces.

15. The illumination system as claimed in claim 14, wherein the at least one lighting device includes two lighting devices being oppositely disposed and forming a space therebetween, in which the reflector is disposed therein.

16. The illumination system as claimed in claim 15, wherein the luminous portions of the two lighting devices define an alignment, which is adapted to divide the space into a first half portion and a second half portion, wherein the first half portion is proximate to the projection surface and the second half portion is distal from the projection surface, and the second reflecting structure is disposed within the second half portion.

17. The illumination system as claimed in claim 11, wherein the first reflecting structure is a triangular prism having two inclined planes forming an included angle therebetween, in which the two inclined planes define two first reflecting surfaces, and the second reflecting structure includes two protrusions, being respectively formed on the two inclined planes in connection, with the protrusions having top surfaces which define two second reflecting surfaces.

18. The illumination system as claimed in claim 17, wherein the at least one lighting device includes two lighting devices being oppositely disposed, in which the reflector is disposed between the two lighting devices.

19. The illumination system as claimed in claim 18, wherein the two lighting devices forming a space therebetween, wherein the luminous portions of the two lighting devices define an alignment, which is adapted to divide the space into a first half portion and a second half portion, wherein the first half portion is proximate to the projection surface and the second half portion is distal from the projection surface, and the second reflecting structure is disposed within the first half portion.

20. The illumination system as claimed in claim 11, wherein the first reflecting structure has two first reflecting surfaces adjacently disposed towards the same direction, and the second reflecting structure has two second reflecting surfaces adjacently disposed towards the same direction and outwardly formed on the two first reflecting surfaces respectively, wherein each of the first reflecting surfaces is a first inward curved surface and each of the second reflecting surfaces is a second inward curved surface in which the first inward curved surface and the second inward curved surface are substantially parallel with each other.

21. The illumination system as claimed in claim 11, wherein the first reflecting surface is a first inward curved surface and the second reflecting surface is a second inward curved surface, in which the first inward curved surface and the second inward curved surface are substantially unparallel with each other.

22. The illumination system as claimed in claim 11, further comprising a light gathering device and a light integration rod, in which the light reflected by the reflector is adapted to be guided through the light gathering device into the light integration rod.

23. The illumination system as claimed in claim 16, further comprising a light integration rod in which the first portion and the second portion of the light are substantially guided into the light integration rod.

* * * * *